Patented June 2, 1936

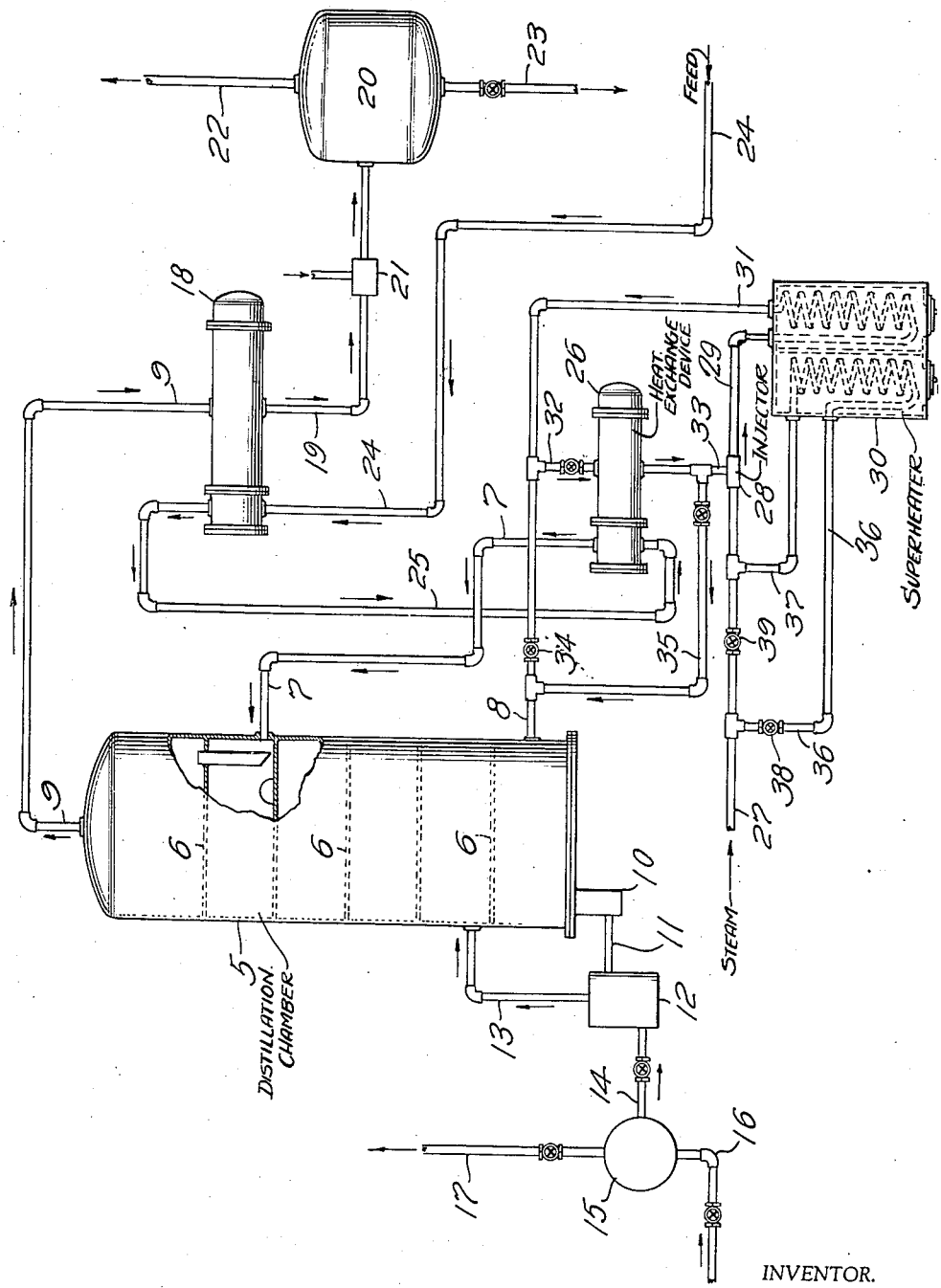

2,042,713

UNITED STATES PATENT OFFICE 2,042,713

ART OF HEATING AND DISTILLATION

James W. Gray, Mountain Lakes, N. J., assignor to Luis de Florez

Application November 10, 1933, Serial No. 697,456

12 Claims. (Cl. 202—61)

The present invention relates to improvements in the application of inert gaseous heating media, and particularly steam, in distillation, heating, and other operations wherein it is desired to employ the inert gaseous heating medium both for the heating of a material to be treated by indirect heat exchange and in the treatment of the material as process steam; for example, in reducing the partial pressure of vaporization of constituents of the material in heating and distillation operations, in hydrolysis and the like. It will be fully understood from the following description, illustrated by the accompanying drawing, in which the figure shows diagrammatically and partly in section apparatus suitable for carrying the invention into effect in one application or embodiment thereof.

In the embodiment shown in the drawing, the invention is illustrated in connection with the distillation of an oily material, such as the fatty acid stock resulting from the hydrolysis of fats, and with steam as the inert gaseous heating and process medium employed.

Referring more particularly to the drawing, the numeral 5 indicates the chamber wherein the inert gaseous heating medium or steam is employed in the process in direct contact with the material under treatment. In the embodiment shown this is illustrated as a stripping and distillation column provided suitably with a plurality of bubble-cap plates 6 or other fractionating or stripping plates. The material to be subjected to treatment is supplied to the vessel or column 5, preheated as hereinafter described, through the line 7 and the process steam or other inert gaseous medium is supplied to the vessel or column 5 through the line 8, suitably near the bottom of the vessel and in such manner as to contact directly with the stock or material fed into the column. In the embodiment shown, a vacuum is maintained on the column and distillation takes place, a mixture of steam and vaporized fatty acids passing out of the column through the line 9. Unvaporized material, which may be designated pitch or residue, is drawn off from a sump 10 in the bottom of the tower through line 11 to a chamber or receiver 12 vented to the vessel or tower 5 through the line 13. The pitch or residue collects in the chamber or vessel 12 and may be discharged from the latter through the valved line 14 to an accumulator tank 15 which is provided with a valved discharge line 16 and a valved vent pipe 17. As is readily apparent, in case of the operation of the column or vessel 5 under vacuum, residual material may be accumulated in the accumulator tank 15 while maintaining the latter under vacuum, and at intervals, the latter may be cut off from the system by means of the valve in line 14, the vacuum released upon the accumulator tank 15, its contents discharged and the accumulator then again closed off from the atmosphere and connected to the system.

As indicated above, it is desired to preheat the fatty acid stock or material entering the chamber or column 5 through the line 7 and it is likewise desired to employ steam or other inert gaseous medium within the column or vessel 5 in the process or operation conducted on the material introduced therein. It is desirable that the heating of the fatty acid stock or other material introduced into the column 5 be conducted under carefully controlled conditions, by indirect heat exchange with an inert gaseous medium of the same character as that employed in direct contact with the material under treatment in the process carried out in the vessel or column 5. However, the requirements as to quantity of steam or other inert gaseous heating medium, as well as thermal content may be quite different for the process use of the gaseous heating medium and for the preheating of the material employed in the process. While desirable to employ the same gaseous heating medium in both the preheating operation by indirect heat exchange and in the process use thereof, it is necessary that there be an independent control of the amounts and thermal content of the gaseous medium employed in each operation. In accordance with the present invention, such utilization of the gaseous heating medium may be secured and without employing a plurality of heating means therefor, an embodiment of the method and means for the purpose being illustrated in the drawing.

As shown in the drawing, the vapors withdrawn from the chamber or column 5 through the line 9 pass to a partial condenser 18, which is an indirect heat exchanger of any suitable form. From the partial condenser 18, the cooled and partly condensed materials pass out through the line 19 to a separator 20, additional cooling being effected, if desired, by applying a spray of water or other suitable cooling agent to the material entering the separator 20 at the point 21 by means of a spray condenser. The separator 20 is provided with a vapor outlet line 22 leading to the usual accessory apparatus, such as additional condensing apparatus, if desired, and also to a vacuum pump if the system is to be evacuated or to a pressure release valve if it is to be maintained under pressure. Such accessory means, being of any suitable type, is not illustrated. The separator 20 is also provided with a suitable valved discharge line 23.

The fatty acid stock or material to be treated is supplied through the line 24, passing to the partial condenser 18, where it is somewhat preheated by indirect heat exchange with the vapors entering the partial condenser 18 from the vessel or column 5 through the line 9. From the partial condenser 18, the somewhat preheated feed stock or fatty acid stock passes through the line 25 to the principal heater 26, which is an indirect heat exchanger wherein the fatty acid stock is heated to the desired temperature for admission to the vessel or column 5. The heated fatty acid stock passes from the heater 26 through the line 7 to the vessel 5, suitably entering the latter at an upper point in the column in the case of the admission of the fatty acid stock to a stripping or distillation column.

The steam or inert gaseous medium employed in the system is supplied through the line 27 under suitable pressure as hereinafter set forth. It enters the system through an injector or thermo-compressor 28, where it joins steam which is being recirculated through the system at any suitable point in its cycle, and causes the recirculation of the steam. In the embodiment shown, the additional steam enters the cycle before the superheater. The combined steam, at lower pressure than the steam entering through the line 27, then passes through the line 29 to a superheating furnace 30, diagrammatically illustrated, and of any conventional type, preferably a coil heating furnace. In the superheating furnace, the combined steam is brought to the desired temperature at which it is intended to employ it in the heater 26 as a heating medium. The heated combined steam passes from the superheater 30 through the line 31, from which a line 32 leads to the heater 26. Here the desired proportion of steam is employed to heat the fatty acid stock or material entering the vessel 5, the steam being thereby cooled. From the heater, the used steam passes through the line 33 to injector or thermo-compressor 28, where it is picked up and combined with the fresh steam supplied to the system and recirculated.

A part of the superheated steam leaving the superheater through the line 31 enters the vessel or column 5 through the line 8, which joins the line 31 and is provided with a suitable control valve 34. In case it is desired to reduce the temperature of the steam entering the vessel or column 5 through the line 8, a portion of the steam leaving the heater 26 and cooled therein may be diverted from the line 33 through the valved line 35 to the line 8.

To further illustrate the present invention, the details of an operation under commercial conditions may be given, the material subjected to treatment being a fatty acid stock and steam being employed as the heating and processing medium. While details of such an operation are given hereinafter, it is to be understood that they are for the purpose of illustration and are not to be regarded as limitations upon the scope of the invention.

In such an operation, the amount of fatty acid stock fed to the system is 1269 lbs. per hour, approximately 90% or 1143 lbs. thereof being removed from the column 5 through the line 9 as vapor, together with such amounts of steam as are employed for heating and partial pressure distillation purposes in the column 5. The vapors from the column 5, in passing through the partial condenser 18, preheat the fatty acid stock to a temperature in the order of 350° F., at which temperature the fatty acid stock enters the principal heater 26. In the latter, it is heated by the superheated steam as hereinafter set forth to a temperature of about 490° F., at which temperature it is admitted in to the column 5 through the line 7.

The column 5 is maintained under a vacuum say of about 24 inches at its outlet. In the operation of the column, it is found convenient to use superheated steam at a temperature of about 700° F., the requirements for the column being somewhat in excess of 1400 lbs. of steam per hour in order to secure the desired heating and partial pressure effect within the column 5. Suitably, about 1403 lbs. of steam per hour at 2 lbs. gauge pressure are supplied to the column, maintaining a bottom temperature therein of about 600° F., the pressure of the steam being reduced to the column pressure on entering the latter. The steam being supplied to the column at 700° F., the steam superheater 30 is so controlled as to maintain the temperature of the seam at its outlet at approximately 700° F., and 2 lbs. gauge pressure. Under these conditions, it is found that approximately 1850 lbs. of steam per hour are required to effect the desired heating in the heater 26. The total amount of steam required to be delivered from the superheater is thus slightly more than 3250 lbs. per hour.

In the operation in accordance with the present invention, the amount of steam required for heating purposes in the heater 26 is continuously recirculated through the heater 26 and the steam superheater 30, passing from the steam superheater through the lines 31 and 32 to the heater 26 and thence through the lines 33 and 29 back to the superheater. At the injector or thermo-compressor 28, an amount of steam equivalent to that required for process purposes is injected into the cycle at a sufficiently high pressure to maintain the necessary pressure gradient on the steam for its circulation and delivery into the column 5 and for utilization in the heater 26. In order to accomplish this, about 1400 lbs. of steam per hour in supplied through the line 27 at a pressure of 90 lbs. gauge, the added steam combining at the thermo-compressor 28 with the steam being recirculated through the heater and amounting to about 1850 lbs. per hour, the combined steam entering the steam superheater through the pipe 28 at a pressure of about 6.5 lbs. gauge. The combined steam is discharged from the steam superheater 30 through the line 31, from which about 1400 lbs. per hour at 2 lbs. gauge is withdrawn through the valved line 8 and discharged into the column 5 to effect heating and partial pressure effects therein as hereinbefore set forth.

It is readily apparent that the conditions of operations may be widely varied. The temperature to which the steam is superheated may, of course, be varied as desired. In the case illustrated, it has been found satisfactory to deliver the superheated steam to the vessel 5 for process use and to the heater 26 for heating purposes at the same temperature. In general, it is found satisfactory to deliver the heating medium to the heater 26 at any temperature found convenient for use in the vessel 5 for process purposes. However, if it be desired to deliver the heating medium to the heater 26 at a higher temperature than that at which it is desired to deliver it to the vessel 5 for process use, some of the steam leaving the heater 26 at a substantially reduced temperature through the line 33 may be diverted through the valved line 35 to enter the line 8 in any desired proportion in combination with steam derived directly from the superheater through line 31, thereby securing any desired reduction in the temperature of the steam entering the vessel 5 for process purposes. Other means may be employed for securing such cooling; for example, the introduction of steam from line 27.

The amount of steam supplied to the system through the line 27 is controlled to compensate for the amount of steam withdrawn from the closed heating cycle for use for process purposes in the chamber 5. Under the conditions described in the specific embodiment hereinbefore set forth, the additional steam is supplied through the line 27 at a pressure of 90 lbs. to maintain the desired conditions in the system. If a smaller proportion of steam be required for process purposes relative to that required in the closed heating cycle, it may be supplied at a higher pressure; or if a greater proportion of added or process steam be required, it may be supplied at a lower pressure.

It is likewise readily apparent that the fresh steam supplied to the system through the line 27 may be superheated before reaching the injector or thermo-compressor 28, for example, by passing it or a portion of it through the line 36 into and through suitable coils provided in the superheater 30, the superheated steam then reentering the line 27 through the line 37, suitable valves 38 and 39 being provided for the control of the steam passed through the superheater in this manner. As is readily apparent, for this purpose special coils are required in the steam superheater which must be eliminated therefrom if fresh, entering steam is not to be superheated.

While in the specific example, steam has been referred to as the heating and processing agent, it is readily apparent that other inert gases may be used. In steam distillation operations, the process may be employed in the treatment of any fatty or oily material, mineral oils or in any distillation process where the presence of inert gaseous medium is desired for heating or partial pressure effects or both. Furthermore, the present invention may be employed in connection with processing operations generally where both heating and admission of an inert gaseous medium is desired for agitation, reaction or partial pressure effects.

I claim:

1. The method of heating and distilling fatty acid stocks wherein the fatty acid stocks are heated and subsequently discharged into a vessel wherein they are contacted with steam, the method which comprises maintaining a circulation by passing steam through a superheater, bringing the superheated steam into indirect heat exchange with fatty acid stock to heat the same and thereupon returning it to the superheater, withdrawing a portion of the steam leaving the superheater and discharging it into said vessel in contact with the fatty acid stock under treatment therein and injecting additional steam into that within said circulation after said indirect heat exchange, said additional steam being supplied under a pressure and in a manner to maintain the circulation of the steam.

2. The method of heating and distilling fatty acid stocks wherein the fatty acid stocks are heated and subsequently discharged into a vessel wherein they are contacted with steam, the method which comprises maintaining a circulation by passing steam through a superheater, bringing the superheated steam into indirect heat exchange with fatty acid stock to heat the same and thereupon returning it to the superheater, withdrawing a portion of the steam leaving the superheater and discharging it into said vessel in contact with the fatty acid stock under treatment therein, admixing with said withdrawn steam before entering the vessel cooler steam diverted from said circulation, and injecting additional steam into that entering the superheater after said indirect heat exchange, said additional steam being supplied under a pressure and in a manner to maintain the circulation of the steam.

3. In the heating and processing of a material wherein the said material is heated and subsequently discharged into a vessel to be contacted therein with heated gas, the steps which comprise circulating a gaseous medium through a superheating means, then into indirect heat exchange with the said material to be heated and thereupon returning it to the superheating means, withdrawing a portion of the heated gaseous medium leaving the superheating means and discharging it into contact with the material under treatment in said vessel, and injecting additional gaseous medium into that entering the superheater, said additional gaseous medium being supplied under a pressure and in a manner to maintain the circulation of the gaseous medium.

4. In the heating and processing of a material wherein the said material is heated and subsequently discharged into a vessel to be contacted therein with a heated gas, the steps which comprise circulating a gaseous medium through a superheating means, then into indirect heat exchange with the said material to be heated and thereupon returning it to the superheating means, withdrawing a portion of the heated gaseous medium leaving the superheating means and discharging it into contact with the material under treatment in said vessel, and injecting additional gaseous medium into that entering the superheater in amount corresponding to the amount of heated gaseous medium withdrawn and controlling the pressure of the additional gaseous medium thus supplied to maintain the said circulation of the gaseous medium.

5. The method of applying a gaseous medium for heating and processing purposes which comprises maintaining a circulation of the gaseous heating medium from a superheating means through a heat exchange device and back to said superheating means, withdrawing a portion of the gaseous medium leaving the superheating means and discharging it into a processing means, and injecting into the gaseous medium entering the superheating means additional quantities of the gaseous medium corresponding to the portion withdrawn under a pressure higher than that of the heating medium entering the heat exchange device and controlling the pressure of the gaseous medium thus injected to maintain the said circulation of the gaseous heating medium.

6. The method of applying steam for heating and processing purposes which comprises maintaining a circulation of steam from a superheating means through a heat exchange device and back to said superheating means, withdrawing a portion of the heated steam leaving the superheating means and discharging it into a processing means, and injecting by jet action additional quantities of steam into that entering the superheating means under a pressure higher than that of the steam entering the heat exchange device to compensate for substantially all that withdrawn and to maintain by such jet action the said circulation of the steam.

7. The method of applying steam for heating and processing purposes which comprises maintaining a circulation of steam from a superheating means through a heat exchange device and back to said superheating means, withdrawing a portion of the superheated steam leaving the superheating means and discharging it into a processing means, injecting into the steam entering the superheating means from the heat exchange device additional quantities of steam equivalent to the portion withdrawn under a pressure higher than that of the steam entering the heat exchange device and controlling the pressure of the steam thus supplied to maintain said circulation of the steam.

8. The method of applying steam for heating and processing purposes which comprises maintaining a circulation of steam from a superheating means through a heat exchange device and back to said superheating means, withdrawing a portion of the superheated steam leaving the superheating means and discharging it into a processing means, diverting from the circulation additional steam after leaving the heat exchange device and combining the additional steam thus withdrawn with the previously withdrawn superheated steam, thereby controlling the temperature of the latter, injecting into the steam entering the superheating means additional quantities of steam under a pressure higher than that of the steam entering the heat exchange device corresponding to the amounts withdrawn from said circulation and controlling the pressure of the steam thus supplied to maintain the said circulation of the steam.

9. In steam heating and distillation apparatus, a distillation vessel, a heat-exchange device, means for passing material to be treated through said heat-exchange device into said vessel, a steam superheater, means for conducting superheated steam from said superheater to said heat-exchange device to heat the material passing therethrough, means for passing a portion of the superheated steam leaving the superheater into said distillation vessel, and means for withdrawing steam from the said heat-exchange device and returning it to the superheater, said means including an injector connected to said heat-exchange device to withdraw steam therefrom and means for supplying additional steam under pressure to said injector to compensate for that supplied to the distillation vessel combined with the steam withdrawn from said heat-exchange device, the combined steam entering the superheater.

10. In apparatus for heating and processing a liquid by means of an inert gaseous medium, means for superheating said gaseous medium, a heat-receiving device through which the liquid is adapted to pass, means for discharging heated gaseous medium from the said superheating means, means for removing a portion of the heated gaseous medium discharged from said superheating means and supplying it to processing means, means for conducting the remainder of said heated gaseous medium to the heat-receiving device to heat the liquid passing therethrough, and means for returning the gaseous medium supplied to said heat-receiving device to the superheating means, said returning means including a thermo-compressor, means for supplying additional gaseous medium to said thermo-compressor under pressure in amount to compensate for substantially all that removed, the gaseous medium thus returned being combined with the additional gaseous medium supplied to said thermo-compressor, and means for conducting the combined gaseous medium to said superheating device.

11. In steam heating and distillation apparatus, a distillation vessel, a heat-exchange device, means for passing material to be treated through said heat-exchange device into said vessel, a steam superheater, means for conducting superheated steam from said superheater to said heat-exchange device to heat the material passing therethrough, means for passing a portion of the superheated steam leaving the superheater into said distillation vessel, and means for withdrawing steam from the said heat-exchange device and returning it to the superheater, said means including an injector connected to said heat-exchange device to withdraw steam therefrom and means for supplying additional steam under pressure to a separate heating means in the superheater to compensate for the steam supplied to the distillation vessel, and means for conveying said additional steam to said injector to combine with the steam withdrawn from the heat-exchange device, the combined steam entering the superheater.

12. The method of applying a gaseous medium for heating and processing purposes which comprises maintaining a circulation of the gaseous heating medium from a superheating means through a heat exchange device and back to said superheating means, withdrawing a portion of the gaseous medium leaving the superheating means and discharging it into a processing means, and injecting by jet action additional quantities of the gaseous heating medium into that entering the superheating means substantially equivalent to the portion withdrawn and under a pressure higher than that of the heating medium entering the heat-exchange device and in a manner to maintain by such jet action the said circulation of the gaseous medium.

JAMES W. GRAY.